Oct. 10, 1950 W. W. KOMPART 2,525,685
AIR CONDITIONING CONTROL SYSTEM AND METHOD
Filed May 17, 1946
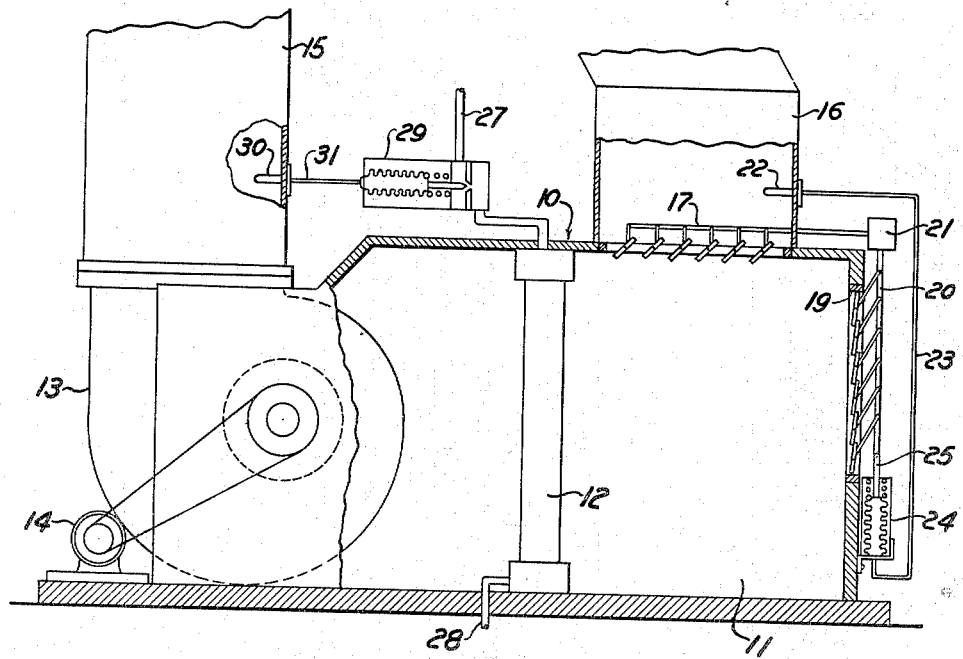
INVENTOR.
WALTER W. KOMPART.
BY
ATTORNEY.

Patented Oct. 10, 1950

2,525,685

UNITED STATES PATENT OFFICE 2,525,685

AIR-CONDITIONING CONTROL SYSTEM AND METHOD

Walter W. Kompart, Steubenville, Ohio, assignor to National Steel Corporation, a corporation of Delaware Application May 17, 1946, Serial No. 670,599

4 Claims. (Cl. 236—38)

This invention relates to an air conditioning system and to a method of operating such a system, and is primarily concerned with supplying conditioned air to a factory or other type of building or confined space.

In a building where, for example, manufacturing operations are carried out, it is often necessary to supply conditioned air to the building to maintain the proper temperature in the building. Especially under those conditions where smoke, fumes, dust, or the like are produced by the operations carried out in the building, it is desirable to supply a relatively large amount of fresh air to effect the necessary amount of ventilation and dissipate the foreign material in the air and produce satisfactory working conditions. During excessively cold periods, the amount of heat required to warm a large amount of outside air necessary to maintain proper ventilation is excessive and the cost is above a practical economical level. Accordingly, there is a need for a system that will supply the maximum amount of conditioned fresh air to a confined space consistent with the cost of conditioning the air.

A primary object of this invention is to provide an improved method of and an apparatus for supplying the maximum quantity of conditioned fresh air to a confined space without unduly increasing the cost of conditioning the air.

Another object of the present invention is to provide an air conditioning system including means for conditioning the air and so constructed and arranged that it will operate at its most efficient capacity.

It is also an object of this invention to provide a method of and an apparatus for conditioning air which is economical to install and maintain and which will provide a maximum amount of conditioned fresh air.

The present invention provides an air conditioning system which will supply a maximum quantity of conditioned fresh air to a space without increasing the cost above that which is economically sound. This is, at least in part, accomplished by a control means responsive to the temperature of the outside air for controlling the flow of air to the system that is subsequently conditioned. This control means is automatically operable to admit only outside air to the plenum when the outside air temperature is above a predetermined temperature and are automatically operable to admit both outside air and only sufficient recirculated air to maintain the mixed air temperature in the plenum at about this predetermined temperature when the outside air has a lower temperature. The temperature of the outside air controls the amount of recirculated air, if any, that is mixed with the outside air so that the air which is to be treated or conditioned never has a temperature below a predetermined temperature, such as 30° F. Thus, the conditioning system supplies all outside air to the space except when the temperature of the outside air is so low as to make the cost prohibitive. Further, the heater for heating the air operates at, or substantially at, its maximum, most economical capacity whenever the air in the plenum has a temperature below this predetermined temperature and it is only when the outside air has a temperature higher than the predetermined temperature that the amount of heat is reduced. When the outside air temperature is equal to or above the temperature desired in the confined space, then no heat is added to the air.

These and other objects and advantages will become more apparent from the following detailed description taken with the accompanying drawing which is a somewhat diagrammatical, side elevational view of an apparatus embodying the features of the present invention and having a portion of the casing removed to show more clearly the internal structure.

Referring to the drawing, the air conditioning system includes a casing 10 containing a plenum 11 and a heater or radiator 12. An air circulating pump or fan 13 driven by motor 14 is provided at the outlet end of casing 10 for circulating air through the system and discharging conditioned air through the outlet duct 15 to a confined space, such as a room, not shown. The casing 10 is provided with an inlet duct 16 which communicates with a source of outside air and in which an adjustable, normally open damper 17 is mounted for controlling the amount of outside air drawn into the plenum 11 by fan 13. A recirculated air duct 19 extends through the wall of the casing 10 and communicates with the space being conditioned. An adjustable normally closed damper 20, in duct 19, controls the amount of recirculated air drawn into the plenum 11 by the circulating fan 13. The dampers 17 and 20 are interconnected through a suitable linkage or other means at 21 so that damper 20 is held in its normally closed position when damper 17 is in its normally open position, as shown in the drawing and, when the damper 20 is progressively opened, as will be more fully hereinafter described, the damper 17 is progressively closed a corresponding amount. The dampers 17 and 20 are so arranged as to admit a substantially uniform total amount of air to the plenum 11, regardless of the relative amounts of fresh and recirculated air.

A thermostat 22 is mounted in the duct 16 or other suitable location so that it can respond to the temperature of the outside air and is operatively connected through a tube 23 to a hydraulic valve 24 which is in turn connected to the damper 20 through its valve stem 25. When the outside air temperature is above a predetermined temperature, such as 30° F., the dampers 17 and 20 remain in their normally open and closed positions, as shown. As the outside air temperature drops below 30° F., thermostat 22 actuates valves 24 to move valve stem 25 upwardly and progressively close damper 17 and open damper 20 so as to admit sufficient recirculated air to maintain a mixed air temperature of about 30° F. in the plenum 11. If the temperature of the outside air rises to a temperature above 30° F., the thermostat 22 actuates valve 24 which moves valve stem 25 progressively downward to close damper 20 and open damper 17. Thus, the flow control means is responsive to the outside air temperature and is automatically operable to admit only outside air when the outside air temperature is above a predetermined temperature and is automatically operable to admit both fresh air and recirculated air when the outside air temperature is below this predetermined temperature. When the outside air temperature is equal to or below a predetermined temperature, the temperature in plenum 11 is substantially equal to this predetermined temperature.

The air conditioning radiator 12 is connected through a pipe line 27 to a source of steam, not shown, and is connected through a pipe 28 to a suitable drain. A hydraulic valve 29 is provided in line 27 for controlling the amount of heat supplied to the heating means 12. A thermostat 30 is mounted in the outlet duct 15 and is responsive to the temperature of the conditioned air discharged through duct 15 to the space. Thermostat 30 is operatively connected to the valve 29 through a tube 31 so as to automatically open or close the valve 27 the proper amount to maintain a substantially constant temperature of the conditioned air being discharged through duct 15. For some installations, the temperature of the conditioned air will be maintained at approximately 70° F. If for some reason the temperature of the air in duct 15 rises above the predetermined temperature of 70° F., the valve 29 restricts the flow of steam to radiator 12 and if the temperature of the air in duct 15 drops below 70° F., then valve 29 progressively opens to increase the flow of steam through line 27. The radiator 12 is preferably so designed that when the air in the plenum has a temperature equal to 30° F., which is the temperature at which damper 20 starts to open, the radiator 12 operates at a maximum capacity to maintain a discharged air temperature of, for example 70° F. Thus, the radiator 12 is operated at maximum capacity whenever the outside air temperature is below a predetermined temperature of, for example, 30° F. and is only operated at less than capacity when the outside air temperature is above 30° F. When the outside air temperature is at or above the temperature to which it is desired to maintain the discharged air, the heat to radiator 12 is completely shut off.

In this description, 30° F. has been selected as the temperature at which the air in plenum 11 is preferably maintained and at which damper 20 starts to open and 70° F. has been selected as the temperature at which it is desirable to maintain the conditioned air discharged to the space. Other predetermined temperatures may be selected depending, at least in part, on the process or work being performed in the building and on the average prevailing temperature of the outside air.

Assuming that the temperature of the outside air is above 30° F., only outside air is drawn into the system and the radiator 12 is operated at less than capacity to maintain the conditioned air at 70° F. If the temperature of the outside falls below 30° F., recirculated air is drawn into the system and mixed with the fresh air in an amount sufficient to provide a mixed air temperature of 30° F. in plenum 11. Thus, in the present method of controlling the air conditioning system, only outside air is drawn into the system when the outside air temperature is above a predetermined temperature and both outside air and sufficient recirculated air are drawn into the system to maintain a mixed air temperature equal to the predetermined temperature when the outside air has a temperature below this predetermined temperature. Further, the maximum amount of heat is added to the air drawn into the system as long as the temperature of the outside air is below a predetermined temperature and the amount of heat is reduced only when the temperature of the outside rises above the predetermined temperature.

I claim:

1. An air conditioning system for supplying conditioned air to a confined space comprising, means defining a plenum; outside and recirculated air inlets communicating with the plenum; means for drawing air through the inlets into the plenum and circulating the air through the system to the confined space; a flow control means responsive only to the temperature of the outside air for controlling the relative amounts of outside and recirculated air drawn through said inlets, said flow control means being operable to admit only outside air when the outside air temperature is above a predetermined temperature and being operable to admit outside air and only sufficient recirculated air to maintain the mixed air temperature at about said predetermined temperature when the outside air temperature is below said predetermined temperature; heating means for adding heat to the air as it is circulated through the system before being discharged to the space; control means responsive to the temperature of the heated air and operatively connected to the heating means for controlling the amount of heat added to the air to maintain the temperature of the heated air substantially constant at a temperature higher than said predetermined temperature.

2. The method of operating an air conditioning system for a confined space comprising the steps of introducing only outside air into the system for conditioning when the outside air temperature is above a predetermined temperature; introducing a mixture of outside air and recirculated air from the space into the system for conditioning when the outside air temperature is below said predetermined temperature, the amount of recirculated air in said mixture being that amount necessary to maintain the air mixture at substantially said predetermined temperature; adding a maximum amount of heat to the air introduced into the system when the temperature of the introduced air is below said predetermined temperature to raise the temperature of the air to a relatively higher, predetermined discharge temperature; and adding less than the maximum amount of heat to the introduced air when the temperature of the introduced air is above said predetermined temperature to raise the temperature of the air to said discharge temperature.

3. An air conditioning system for supplying conditioned air to a confined space comprising, means defining a plenum; fresh and recirculated air inlets communicating with the plenum; means for drawing air through the inlets into the plenum and circulating the air through the system to the confined space; a flow control means responsive to the temperature of the outside air only for controlling the relative amounts of outside and recirculated air drawn through said inlets, said flow control means being operable to admit only outside air when the outside air temperature is above a relatively lower predetermined temperature and being operable to admit outside air and only sufficient recirculated air to maintain the mixed air temperature at about said low predetermined air temperature when the outside air temperature is below said lower predetermined temperature; heating means for adding up to a maximum amount of heat to the air from the plenum and raising its temperature as it is circulated through the system to a relatively higher discharge temperature before being discharged to the space; and heat control means responsive to the temperature of the heated air and operatively associated with the heating means and operable to control the amount of heat supplied to the air by said heating means to maintain the heated air at said discharge temperature whereby a maximum amount of heat is added to the air from the plenum when the fresh air temperature is at and below said predetermined temperature and less than the maximum amount of heat is added to the mixed air from the plenum when the fresh air temperature is above said predetermined temperature and below said discharge temperature and no heat is added to the air from the plenum when the outside air is at or above said discharge temperature.

4. An air conditioning system for supplying conditioned air to a confined space comprising means defining a plenum; an outside air inlet for admitting outside air to the plenum; a recirculated air inlet for admitting recirculated air to the plenum from the space; means for drawing air through the inlets into the plenum and circulating the air through the system to the confined space; a normally open damper in the fresh air inlet, said damper being progressively movable toward a closed position for progressively reducing the amount of outside air drawn into the plenum; a normally closed damper in the recirculated air inlet, said normally closed damper being progressively movable toward an open position for progressively increasing the amount of recirculated air drawn into the plenum from the confined space; means connecting the dampers so that the movement of one damper imparts an opposite movement to the other damper, whereby a substantially constant total amount of air is admitted to said plenum through the inlets; control means controlling the relative positions of the dampers and the relative amount of outside and recirculated air drawn through said inlet, said control means being responsive only to the temperature of the outside air and being operable to position the dampers in their normal positions so as to admit only outside air when the outside air temperature is above a predetermined temperature and being operable to position the dampers to admit outside air and only sufficient recirculated air to maintain the mixed air temperature at about said predetermined temperature when the outside air is below said predetermined temperature; heating means for adding heat to the air as it is circulated through the system before being discharged to the space; control means responsive to the temperature of the heated air and operatively connected to the heating means for controlling the amount of heat added to the air to maintain the temperature of the heated air substantially constant.

WALTER W. KOMPART.

REFERENCES CITED

The following references are of record in the file of this patent:

UNITED STATES PATENTS

| Number | Name | Date |
|---|---|---|
| 1,936,544 | Shurtleff | Nov. 21, 1933 |
| 2,209,787 | Miller | July 30, 1940 |
| 2,226,815 | Haines | Dec. 31, 1940 |
| 2,257,007 | Harris | Sept. 23, 1941 |
| 2,315,517 | Greenlee et al. | Apr. 6, 1943 |
| 2,327,536 | Locke | Aug. 24, 1943 |
| 2,327,664 | Otis | Aug. 24, 1943 |
| 2,334,445 | Seelbach | Nov. 16, 1943 |